3,122,325
GARDEN CHEMICAL SPRAYER
William R. Mahrt, Corfu, and Walter R. Schedel, Attica, N.Y., assignors to R. E. Chapin Manufacturing Works, Inc., Batavia, N.Y., a corporation of New York
Filed May 21, 1962, Ser. No. 197,188
8 Claims. (Cl. 239—318)

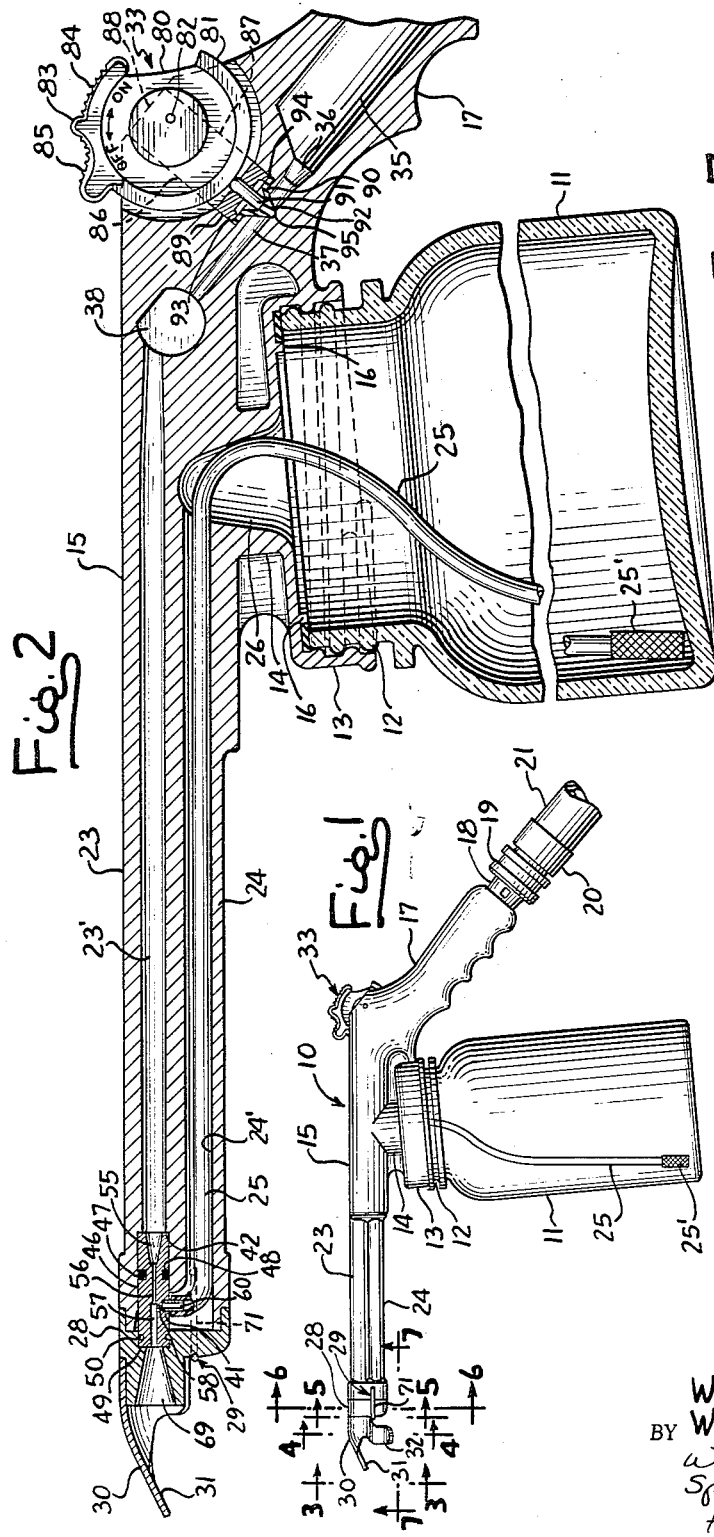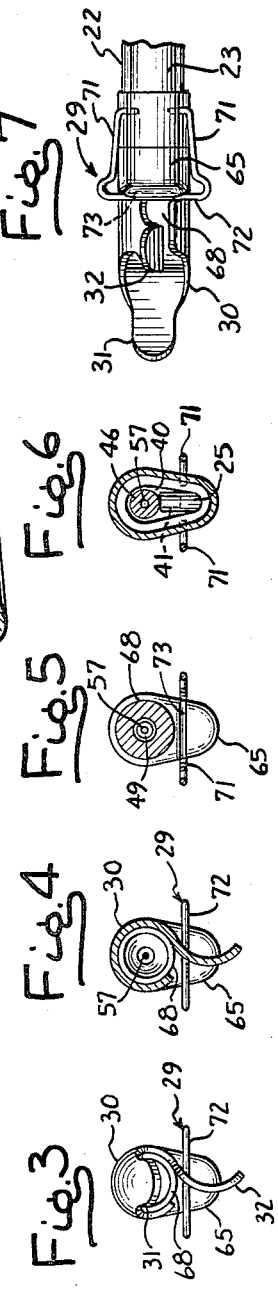

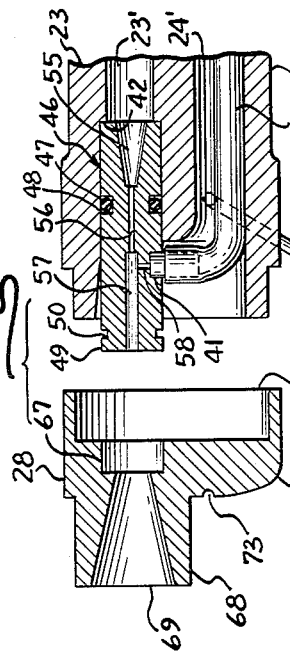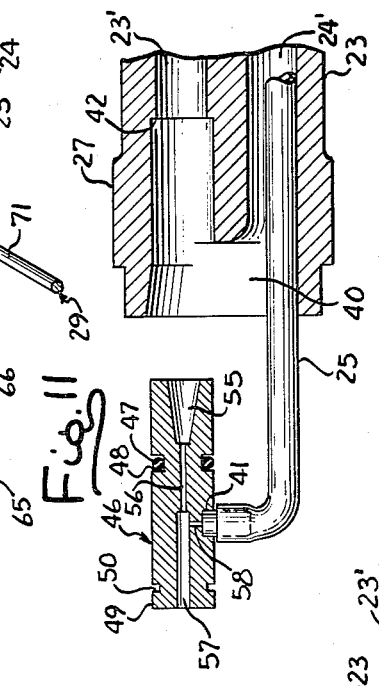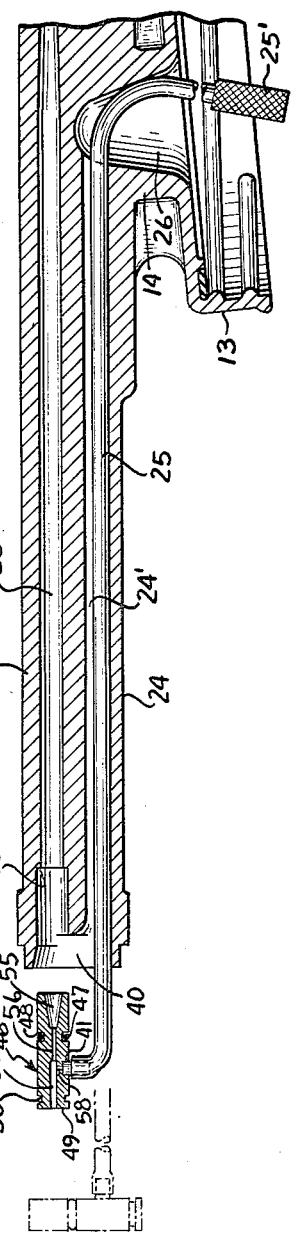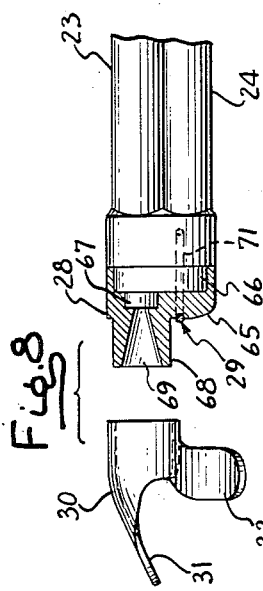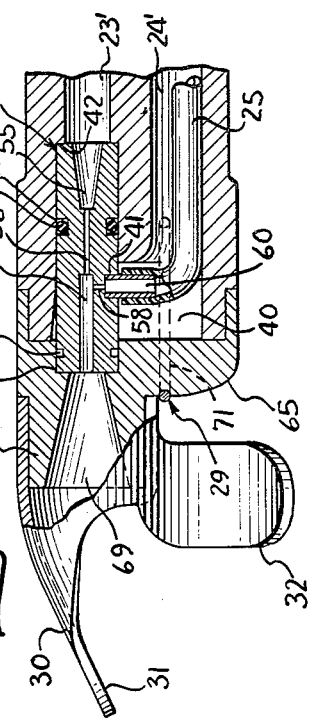

This invention relates to a garden spray device of the type usually having a cast metal spray dispensing nozzle portion which is attachable to a source of water and to a receptacle containing a concentrated solution of a garden chemical, and which, by means of a Venturi generated suction or entrainment action of a metering element within the spray device carrying the stream of water, draws the solution from the receptacle into the water stream with a fairly constant proportion of garden chemical solution to water being maintained over wide variations in water pressure.

One of the most common and frustrating difficulties encountered in the use of garden chemical sprayers is the tendency of the fluid conducting passages, particularly those carrying the concentrated garden chemical solution to the metering element, to become clogged. This condition may result from the build up of loose metal particles due to corrosion of the metal lining the passages involved, or from an accretion or deposition within the passages of the active dissolved powder material in the garden chemical solution. Whatever the cause, such activity eventually renders the sprayer inoperable.

In many instances, access to the clogged passages is not readily possible, or if provision is made to permit insertion of a cleaning instrument, complete unclogging of the passages often cannot be accomplished or the operation is so complicated or tedious that the user does not care to or cannot clean the passages.

It is an object of this invention to provide an improved garden chemical sprayer in which the tendency of the passages therein to become clogged due to the build up of metal particles by corrosion of the walls of the passages carrying the concentrated solution of garden chemical is alleviated, thereby giving the sprayer greater operating efficiency and a longer life.

It is also an object of this invention to provide an improved garden chemical sprayer in which the garden chemical solution carrying and entrainment portions of the sprayer are easily and readily removable and replaceable from the sprayer body for purposes of cleaning and repair when necessary, in that the operator can have easy access to the parts to be cleaned by him, or in that he can conveniently ship the clogged or otherwise inoperable element of the sprayer back to the factory for cleaning or replacement without shipping the entire sprayer.

In accomplishing these objectives, the improved garden chemical sprayer of this invention is provided with a flexible, removable, substantially non-corrodible garden chemical inlet tube which extends from the receptacle containing the solution of a garden chemical to the metering element which is removable with the inlet tube where it can be easily cleaned or replaced. More specifically, the improved garden chemical sprayer of this invention is provided with a flexible inlet tube made of polyethylene or the like, one end of which extends into the garden chemical holding receptacle and the other end of which extends to a nipple on the metering element. The metering element is preferably provided with a knurled head portion, which upon removal of a cap member from the nozzle portion of the sprayer protrudes a sufficient distance from the outlet end of the nozzle portion of the sprayer to enable the user to grip the metering element with his fingers or a suitable tool to effect simultaneous removal of the metering element and the flexible inlet tube.

The cap member is most advantageously held in position by a wire retaining clip pivotally anchored on the nozzle portion of the sprayer. The cap member may be provided with a counterbore adapted to receive and retain the head portion of the metering element. A groove is preferably provided on the outer face of the cap member to receive and hold in place one end of the wire retaining clip.

Other objects, advantages and features of the invention will become apparent upon making reference to the specification to follow, the claims and drawings wherein:

FIG. 1 is a side view in elevation of a garden chemical sprayer embodying the improvements of this invention;

FIG. 2 is an enlarged longitudinal vertical sectional view of the garden chemical sprayer of FIG. 1;

FIG. 3 is an enlarged front view in elevation of the discharge end of the garden chemical sprayer illustrated in FIG. 1 with the deflector unit mounted thereon;

FIG. 4 is an enlarged vertical sectional view taken along line 4—4 of FIG. 1;

FIG. 5 is an enlarged vertical sectional view taken along line 5—5 of FIG. 1;

FIG. 6 is a vertical sectional view taken along line 6—6 of FIG. 1;

FIG. 7 is an enlarged bottom plan view of the outlet end of the garden chemical sprayer of FIG. 1;

FIG. 8 is a fragmentary exploded view, partly in section, of the outlet end of the garden chemical sprayer of FIG. 1;

FIG. 9 is an enlarged fragmentary longitudinal sectional view of the outlet end of the garden chemical sprayer of FIG. 1;

FIG. 10 is an enlarged fragmentary longitudinal sectional view of the outlet end of the garden chemical sprayer of FIG. 1 with the end cap member removed from the end of the sprayer body;

FIG. 11 is an enlarged fragmentary longitudinal sectional view of the outlet end of the garden chemical sprayer of FIG. 10 as the metering element and inlet tube are being removed as a unit from the sprayer body; and FIG. 12 is a fragmentary longitudinal sectional view of the garden chemical sprayer of FIG. 11 showing the manner in which the metering element and attached inlet tube are reinserted into the sprayer body.

Referring now to the drawings which illustrate a preferred embodiment of the invention, the sprayer, designated generally at 10, comprises a jar 11, which may be made of glass or plastic, containing a solution of a concentrated insecticide, fertilizer, or other garden chemical. The jar 11 has an open top defined by an externally threaded neck 12 to which an internally threaded cap portion 13 of a cast metal sprayer body is threadedly engaged. The cap portion 13 has a neck portion 14 connecting it to a pistol-shaped body portion 15. The cap portion is provided with one or more ports or atmospheric vents 16 (FIG. 2).

The pistol-shaped body portion 15 has an undulated handle or hand gripping portion 17 to the inlet end of which a back flow preventing valve end portion 18 is connected. The valve end portion 18 has an internally threaded coupling 19 swively engaged therein which is adapted to be connected to a correspondingly externally threaded fitting 20 of a garden hose 21.

The pistol-shaped portion 15 of the sprayer body has an elongated double-barrelled section comprising an upper barrel 23 and a lower barrel 24. The lower barrel 24 has an open ended longitudinal bore or passage 24′ which contains a flexible inlet tube 25 made of polyethylene or similar material. The inlet tube 25 has sediment screen 25′ affixed to the inner end thereof. The hollow interior of the cap portion 13 open onto a large, upwardly converging bell-shaped recess formed in the bottom portion of the sprayer body surrounded by the threaded cap portion 13 of the sprayer body. The recess is much wider than the diameter of the inlet tube. The rear end of the bore 24' intersects the forward defining wall of the recess 26 and the inner end portion of the inlet tube has a gradual, as distinguished from a sharp bend which directs the tube extends down into the jar 11 through the recess 26.

The upper barrel 23 has a longitudinal water carrying passageway or bore 23' which opens onto the front end of the sprayer body as does the tube receiving bore 24'. The open front ends of the bores 23' and 24' are covered by a cap member 28 releasably held thereon by a wire clip 29. The cap member 28, in turn, is adapted to receive a removable, adjustable deflector 30 having an inwardly directed fluid impinging portion 31 and an arcuate finger-engaging adjusting portion 32.

Substantially at the juncture of the handle or hand gripping portion 17 and the double barrelled section of the sprayer body, a thumb operated "on-off" control valve 33 is provided to regulate the flow of water through the water carrying bore 23'. The handle or hand gripping portion 17 has a longitudinal passage 35 through which water from the garden hose 21 flows. The passage 35 constricts abruptly at its outlet end into a short tapered passage 36 which communicates with a relatively narrow, elongated, tapering passage 37 traversing the location in the sprayer body where the "on-off" valve 33 is positioned. The passage 37 enters a chamber 38 formed in the sprayer body during the casting thereof. The chamber 38 connects with the longitudinal water carrying bore 23' of the barrel 23. Except for a short distance from the point of its emergence from the chamber 38, the bore 23' is substantially uniform in cross-section.

The bore 24' connects with the bore 23' only at the front end of the sprayer body through an opening 40. The inlet tube 25 makes connection with the substantially cylindrical nipple 41 of a metering element 46 through the opening 40. The metering element 46 is mounted in the front end of the sprayer body upper barrel bore 23', the metering element abutting against a narrow shoulder 42. A fluid seal is obtained between the walls defining the bore 23' and the outer surface of the metering element 46 by a sealing member such as O-ring 47 retained in an annular groove 48. This arrangement, while achieving the indicated objectives, enables the metering element 46 to be readily removed by the user with either his fingers or a suitable tool. Such an operation is facilitated by providing the metering element 46 with a head portion 49, defined by an annular groove 50, which protrudes outwardly from the opening 40. The outer surface of the head portion 49 may be knurled to provide a better gripping surface.

The metering element 46 has a series of axially aligned, fluid conducting passages which function to provide a reduced pressure or Venturi action necessary to effect entrainment of the garden chemical solution in the jar 11 in the water stream coursing through the bore 23'. The inlet or upstream passage 55 of the metering element 46 is tapered and communicates with the bore 23' and connects at its narrowest point with an intermediate substantially cylindrical passage 56 of reduced cross-section. The passage 56, in turn, communicates with a third, substantially cylindrical passage 57, of greater cross-section than the passage 56. A narrow passage 58 is transversely disposed in the wall of the element 46 and intersects the passages 56 and 57 at their point of juncture.

The nipple 41 is formed or press-fitted in the metering element 46 so that it projects transversely thereof into the sprayer body opening 40. This is achieved by counter-boring the passage 58 to provide a bore in the wall of the element 46 sufficient in depth and cross-section to permit a portion of the nipple 41 to be snugly press-fitted therein. The nipple 41 has a centrally disposed passage 60 which communicates with the passage 58. The lower portion of the nipple 41 receives in water tight sealing relation the discharge or outlet end of the flexible inlet tube 25 passing through the lower barrel bore 24'. The inlet tube insulates the concentrated garden chemical from the corrodible metal surfaces of the barrel bore 24' and thus minimizes the possibility of clogging of the sprayer.

The front end of the barrel portion of the sprayer body onto which the upper and lower barrel bores 23' and 24' as well as the opening 40 opens most advantageously is provided with a cap member 65 having a bore 66 adapted to receive in snug frictional engagement the walls of the sprayer body. The cap member 65 is further provided with a substantially cylindrical intermediate bore 67 which receives the head portion 49 of the metering element 46. Continuous with the metering element engaging portion of the cap member 65 is a cylindrical nozzle portion 68 having an outwardly flared passage 69 in substantially coaxial alignment with the bore 67.

The cap member 65 desirably is releasably secured on the sprayer body by a substantially U-shaped resilient wire clip 29, the lateral legs 71—71 of which are pivotally anchored in the lower part of the outlet end 27 of the sprayer body. The transverse leg 72 of the clip 29 is adapted to engage with a horizontal groove 73 in the front face of the cap member 65. Desirably, the length of the leg 72 is such that when the legs 71—71 thereof are bent inwardly an extension at each end of the leg 72 is formed which facilitates manipulation of the clip 29. This is clearly shown in FIG. 7.

The nozzle portion 68 of the cap member 65 as indicated previously hereinabove is adapted to receive a unitary, substantially cylindrical deflector 30 having a flattened, inwardly extending impinging portion 31 and an arcuate, transversely disposed finger-engaging portion 32. That portion of the deflector 30 which engages the nozzle portion 68 of the cap member 65 is slotted to facilitate placement on and removal of the deflector 30 on the nozzle portion 68. The deflector 30 may be readily rotated on the nozzle portion 68 through a complete circle to enable the deflector 30 to be easily adjusted to any desired position.

Upstream from the metering element 46 and the upper barrel bore 23' and downstream from the passage 35 in the handle or hand gripping portion 17 of the sprayer body, an "on-off" valve 33 of unique construction is located (FIG. 2). The valve 33 desirably has a segmental circular cam 80 having a cam surface 81 in eccentric relation with respect to a transverse axis of rotation about pin 82. The sprayer body 15 is suitably slotted to receive the cam 80 and to permit unhampered rotation thereof. The cam 80 is provided with a raised thumb engaging actuator 83, desirably of greater width than the cam 80 to comfortably accommodate the thumb of the operator while he grips the handle portion 17 in the normal manner. The actuator 83 has a convex portion 84 to facilitate movement by the thumb of the cam 80 forward in a cut-off direction, and a concave portion 85 to facilitate movement of the cam 80 in the opposite direction to the "on" position. The actuator 83 may be provided with suitable indicia to indicate the "on" and "off" positions of the valve 33.

The cam 80 is held in a fixed position in the longitudinal slot in the sprayer body by a bifurcated, substantially cylindrical element 86 which is press-fitted or otherwise suitably secured in an inclined bore 87 transversely disposed to the passage 37 in the sprayer body. The cam 80 is received by, and rotates in, an elongated slot 88 in the element 86, and is retained in a fixed rotatable position with relation to the element 86 by the pin 82 which passes through the sides of the element 86 and the central portion of the cam 80 at a point offset from the center thereof.

The element 86 has a base portion 89 provided with a centrally disposed substantially cylindrical bore 90. The bore 90 is adapted to receive in slidable relation a valve body actuating pin 91 one end of which abuts against the cam surface 81 of the cam 80. The opposite end of the pin 91 acts to urge, in response to the movement of the cam 80, a conically shaped, resilient valve body 92 into a position with respect to the passage 37 in the member 15 whereby flow of water through the passage 37 is controlled. The valve body 92 is maintained in a fixed position with relation to the pin 91 by an annular extension 93 in the base portion 89 of the element 86, which extension rigidly abuts against flanges 94 of the valve body 92. The tip of the conical valve body 92 is adapted to extend into a correspondingly shaped depression or notch 95 in the lower wall of the passage 37 when the valve 33 is in the "off" position.

To operate the garden chemical sprayer of this invention, the jar 11 is first filled with a solution of a desired concentration of a garden chemical. The cap portion 13 of the sprayer body is then threadedly attached to the jar and the hand gripping portion 17 is connected to a source of water in the manner hereinabove described. When water is flowing through the garden hose 21, the "on-off" valve 33 is pulled rearward where the cam 80 is positioned at the lower portion of the cam-receiving slot. This action causes the resilient valve body 92 to urge the pin 91 upwardly toward the cam surface 81, and opens the passage 37, permitting water to flow therethrough. As the water flows through the bore 23' and into and through the restricted passages in the metering element 46, an area or zone of reduced pressure is produced at the intersection of passages 56 and 57 over the outlet of the passage 58 in the element 46. This reduction in pressure is sufficient in magnitude to cause the garden chemical solution in the jar 11 to be forced by atmospheric pressure through the flexible inlet tube 25 into the nipple 41 from where it passes into the passage 58 into the carrier water stream. The water, with the thus entrained garden chemical solution, then passes out of passage 57 through the passage 69 in the cap member 65 and impinges against the portion 31 of the deflector 30. The resulting spray may then be directed against any desired object.

Stoppage of the flow of water through the sprayer is readily achieved by simply moving the thumb manipulated actuator 83 forward where the cam 80 is positioned at the downstream extremity of the cam receiving slot of the sprayer body. Such movement of hte cam 80 causes the cam surface 81 to urge the pin 91 in a downward direction against the valve body 92. As the pin 91 moves towards the resilient valve body 92, the latter distends and the conical tip thereof engages in the depression or notch 95, blocking off flow of water into the bore 23'. The action is positive and no leakage around the valve body 92 occurs.

After the garden chemical sprayer of this invention has been used in several spraying operations, or in the event that, for some reason, the metering element 46 has become clogged, the elements thereof wherein clogging may occur can be readily removed for cleaning or repair. This is achieved by releasing the wire clip 29 from its position in the groove 73 of the cap member 65, and slipping the member 65 off the end of the sprayer body. The knurled head 49 of the metering element 46 can then be grasped with the fingers of the operator, or with a suitable tool, and readily removed by pulling forward with sufficient force to cause the metering element 46 to be freed from its position in the passage 23'. The metering element and the inlet tube 25 emerge as a unit from the sprayer body. This is clearly illustrated in FIG. 11. In this position, easy access can be had to all parts of the metering element. Upon completion of the cleaning or repair work performed on the element, it is easily reinserted into its operative position in the sprayer. The inlet tube 25 readily moves through the lower barrel bore 24' and along the wall of the bell or U-shaped recess or bore 26 which serves to guide the tube 25 down into the jar 11 until the metering element is positioned in the end of the barrel bore 23'.

The present invention thus provides an exceedingly efficient and easy to operate garden chemical sprayer. Removal of critical operating parts for maintenance purposes can be readily achieved thereby adding immeasurably to the useful life of the device. Its lightweight and well balanced construction permit it to be used for prolonger periods without discomfort. In single casting fabrication eliminates many machining operations and thus makes it inexpensive to manufacture. Other advantages of the sprayer of this invention will suggest themselves to those in the art.

It should be understood that numerous modifications may be made in the preferred form of the invention above described without deviating from the broader aspects of the invention.

We claim:

1. In a spraying device of the type having a receptacle for holding a concentrated solution of a garden chemical, the receptacle being operatively connected to a sprayer apparatus having a body with a longitudinal passageway having a fluid inlet end and a fluid outlet end for conducting a stream of carrier fluid from a source thereof to a point in the apparatus where the garden chemical solution is caused to be withdrawn from the receptacle and entrained in the carrier fluid prior to the passage of the fluid from the outlet end of the apparatus, the improvement comprising a metering element for providing a pressure drop operable to draw the garden chemical from said receptacle removably positioned at the outlet end of the sprayer body, said metering element being provided with a longitudinal fluid velocity increasing passage substantially in axial alignment with said longitudinal passageway in said prayer body, and a transverse, chemical inlet passage opening on to the side of the metering element and intersecting a low pressure point of said longitudinal passage, the portion of said metering element defining said inlet passage forming a tube connecting means extending transversely of the metering element, a substantially non-corrodible flexible inlet tube connected to and communicating with said tube connecting means and extending into the bottom of said receptacle, said inlet tube and metering element being removable as a unit from the outlet end of the sprayer body, and removable retainer means on the outlet end of the sprayer body and visible and accessible from the outside of the spraying device for releasably holding the metering element within said sprayer body.

2. In a spraying device of the type having a receptacle for holding a concentrated solution of a garden chemical, the receptacle being operatively connected to a sprayer apparatus having a double barrelled body portion defining longitudinal passageways therein, one of the passageways having a fluid inlet end and a fluid outlet end for conducting a stream of carrier fluid from a source thereof to a point in the apparatus where the garden chemical solution is caused to be withdrawn from the receptacle through another of the longitudinal passageways in said body portion and entrained in the carrier fluid prior to the passage of the fluid from the outlet end of the apparatus, the improvement comprising a metering element for providing a pressure drop operable to draw the garden chemical from said receptacle removably positioned at the outlet end of the carrier fluid passageway of the double barrelled portion of the sprayer body, said metering element being provided with a longitudinal fluid velocity increasing passage substantially in axial alignment with said longitudinal carrier fluid passageway in said double barrelled portion, and a transverse, chemical inlet passage opening onto the side of the metering element and intersecting a low pressure point of said longitudinal fluid velocity increasing passage, the portion of said metering element defining said inlet passage forming a tube connecting means extending transversely of the metering element, a substantially non-corrodible flexible inlet tube connected to and communicating with said tube connecting means and extending through said other longitudinal passageway in the double barrelled portion of the sprayer body into the bottom of said receptacle, said inlet tube and metering element being removable as a unit from the outlet end of the sprayer body, and a single integral removable cap member on the outlet end of the sprayer body for closing off the outlet ends of both of the longitudinal passageways therein and for releasably holding the metering element within said sprayer body.

3. In a spraying device of the type having a receptacle for holding a concentrated solution of a garden chemical, the receptacle being operatively connected to a sprayer apparatus having a double barrelled body portion defining longitudinal passageways therein, one of the passageways having a fluid inlet end and a fluid outlet end for conducting a stream of carrier fluid from a source thereof to a point in the apparatus where the garden chemical solution is caused to be withdrawn from the receptacle through a second longitudinal passageway in said body portion and entrained in the carrier fluid prior to the passage of the fluid from the outlet end of the apparatus, the improvement comprising a metering element for providing a pressure drop operable to draw the garden chemical from said receptacle removably positioned at the outlet end of the carrier fluid passageway of the double barrelled portion of the sprayer body, said metering element being provided with a longitudinal fluid velocity increasing passage substantially in axial alignment with said longitudinal carrier fluid passageway in said double barrelled portion, and a transverse, chemical inlet passage opening onto the side of the metering element and intersecting a low pressure point of said longitudinal fluid velocity increasing passage, the portion of said metering element defining said inlet passage forming a tube connecting means extending transversely of the metering element, a substantially non-corrodible flexible inlet tube in said second longitudinal passageway connected to and communicating with said tube connecting means, the bottom of said sprayer body above said receptacle having a recess extending transversely of said second longitudinal passageway and intersecting the end of same, said tube having a gradual bend at said recess where it extends through said recess in the sprayer body into said receptacle, said recess having a width much wider than the width of the inlet tube and enabling the inlet tube to be manually guided between said recess and second longitudinal passageway, said inlet tube and metering element being removable as a unit from the outlet end of the sprayer body.

4. In a spraying device of the type having a receptacle for holding a concentrated solution of a garden chemical, the receptacle being operatively connected to a sprayer apparatus having a double barrelled body portion defining longitudinal passageways therein, one of the passageways having a fluid inlet end and a fluid outlet end for conducting a stream of carrier fluid from a source thereof to a point in the apparatus where the garden chemical solution is caused to be withdrawn from the receptacle through another of the longitudinal passageways in said body portion and entrained in the carrier fluid prior to the passage of the fluid from the outlet end of the apparatus, the improvement comprising a metering element for providing a pressure drop operable to draw the garden chemical from said receptacle removably positioned at the outlet end of the carrier fluid passageway of the double barrelled portion of the sprayer body, said metering element being provided with a longitudinal fluid velocity increasing passage substantially in axial alignment with said longitudinal carrier fluid passageway in said double barrelled portion, and a transverse, chemical inlet passage opening onto the side of the metering element and intersecting a low pressure point of said longitudinal fluid velocity increasing passage, the portion of said metering element defining said inlet passage forming a tube connecting means extending transversely of the metering element, a substantially non-corrodible flexible inlet tube connected to and communicating with said tube connecting means and extending through said other longitudinal passageway in the double barrelled portion of the sprayer body into the bottom of said receptacle, said inlet tube and metering element being removable as a unit from the outlet end of the sprayer body, a removable cap member on the outlet end of the sprayer body for holding the metering element within said sprayer body, and a resilient wire clip member mounted at the outlet end of the sprayer body for retaining said cap member thereon.

5. In a spraying device of the type having a receptacle for holding a concentrated solution of a garden chemical, the receptacle being operatively connected to a sprayer apparatus having a body with a longitudinal passageway having a fluid inlet end and a fluid outlet end for conducting a stream of carrier fluid from a source thereof to a point in the apparatus where the garden chemical solution is caused to be withdrawn from the receptacle and entrained in the carrier fluid prior to the passage of the fluid from the outlet end of the apparatus, the improvement comprising a metering element for providing a pressure drop operable to draw the garden chemical from said receptacle removably positioned at the outlet end of the sprayer body, said metering element being provided with a longitudinal fluid velocity increasing passage substantially in axial alignment with said longitudinal passageway in said sprayer body, and a transverse, chemical inlet passage opening onto the side of the metering element and intersecting a low pressure point of said longitudinal passage, the portion of said metering element defining said inlet passage forming a tube connecting means extending transversely of the metering element, a substantially non-corrodible flexible inlet tube connected to and communicating with said tube connecting means and extending into the bottom of said receptacle, said inlet tube and metering element being removable as a unit from the outlet end of the sprayer body, and removable retainer means including a resilient wire clip mounted on the outlet end of the sprayer body for holding the metering element within said sprayer body.

6. In a spraying device of the type having a receptacle for holding a concentrated solution of a garden chemical, the receptacle being operatively connected to a sprayer apparatus having a double barrelled body portion defining substantially parallel upper and lower longitudinal passageways therein opening onto the front of said body portion, the upper one of said passageways having a fluid inlet end and a fluid outlet end for conducting a stream of carrier fluid from a source thereof to a point in the apparatus where the garden chemical solution is caused to be withdrawn from the receptacle through the lower one of said passageways and entrained in the carrier fluid prior to the passage of the fluid from the outlet end of the apparatus, the improvement comprising a metering element for providing a pressure drop operable to draw the garden chemical from said receptacle removably positioned at the outlet end of the sprayer body, said metering element being provided with at least one fluid velocity increasing passage, and a narrow, transverse, chemical inlet passage in the side of the metering element the outlet end of which opens at a low pressure point in the metering element and a tube-connecting member having a passage communicating with said inlet passage, said double barreled body portion having an upwardly converging, bell-shaped recess in the bottom thereof above said receptacle, said recess intersecting the rear end portion of said lower longitudinal passageway, a substantially non-corrodible flexible inlet tube connected to said tube-connecting member and extending through said lower longitudinal passageway into said bell-shaped recess where it extends down into the bottom of said receptacle, said inlet tube and metering element being removable as a unit from the outlet end of the sprayer body, the defining walls of said recess acting as guide walls which effect a gradual downward bending of said inlet tube when the latter is inserted into said lower longitudinal passageway from the front end thereof and then pushed to the rear thereof where it enters said bell-shaped recess, a removable cap member on the outlet end of the sprayer body where it encloses the front ends of said longitudinal passageways, said cap member having an open ended passage communicating with the upper one of said longitudinal passageways, and a resilient substantially U-shaped wire clip pivotally mounted at the outlet end of the sprayer body for engaging around the front end of said cap member and retaining said cap member thereon.

7. In a spraying device of the type having a receptacle for holding a concentrated solution of a garden chemical, the receptacle being operatively connected to a sprayer apparatus having a double barreled body portion defining substantially parallel upper and lower longitudinal passageways therein, the upper one of said passageways having a fluid inlet end and a fluid outlet end for conducting a stream of carrier fluid from a source thereof to a point in the apparatus where the garden chemical solution is caused to be withdrawn from the receptacle through the lower one of said passageways and entrained in the carrier fluid prior to the passage of the fluid from the outlet end of the apparatus, the improvement comprising a metering element for providing a pressure drop operable to draw the garden chemical from said receptacle removably positioned at the outlet end of the sprayer body, said metering element being provided with at least one longitudinal fluid velocity increasing passage, a narrow, transverse, chemical inlet passage in the side of the metering element the outlet end of which opens at a low pressure point in the metering element, and an inlet tube-connecting means having a passage communicating with said inlet passage, said double barreled body portion having an upwardly converging bell-shaped recess in the bottom thereof above said receptacle, said recess intersecting the rear end portion of said lower longitudinal passageway, a substantially non-corrodible flexible inlet tube connected to said tube-connecting means and extending through said lower longitudinal passageway into said bell-shaped recess where it extends down into the bottom of said receptacle, and the defining walls of said recess acting as guide walls which effect a gradual downward bending of said inlet tube when the latter is inserted into said lower longitudinal passageway from the front end thereof and then pushed to the rear thereof where it enters said recess.

8. The spraying device of claim 3 wherein said receptacle has a threaded open top portion, and said double barreled body portion of said sprayer apparatus having at the inner end thereof a threaded cap portion extending downward therefrom to make engagement with said threaded open top portion of said receptacle, and said recess being within the area of the body portion bounded by said threaded cap portion.

References Cited in the file of this patent

UNITED STATES PATENTS

| | | |
|---|---|---|
| 2,310,633 | Heimburger | Feb. 9, 1943 |
| 2,388,445 | Stewart | Nov. 6, 1945 |
| 2,735,794 | Pletcher | Feb. 21, 1956 |
| 2,965,309 | Parrott | Dec. 20, 1960 |